May 18, 1965  G. H. PORATH  3,183,732
PRECISION LEAD SCREW
Filed Dec. 11, 1962  2 Sheets-Sheet 1
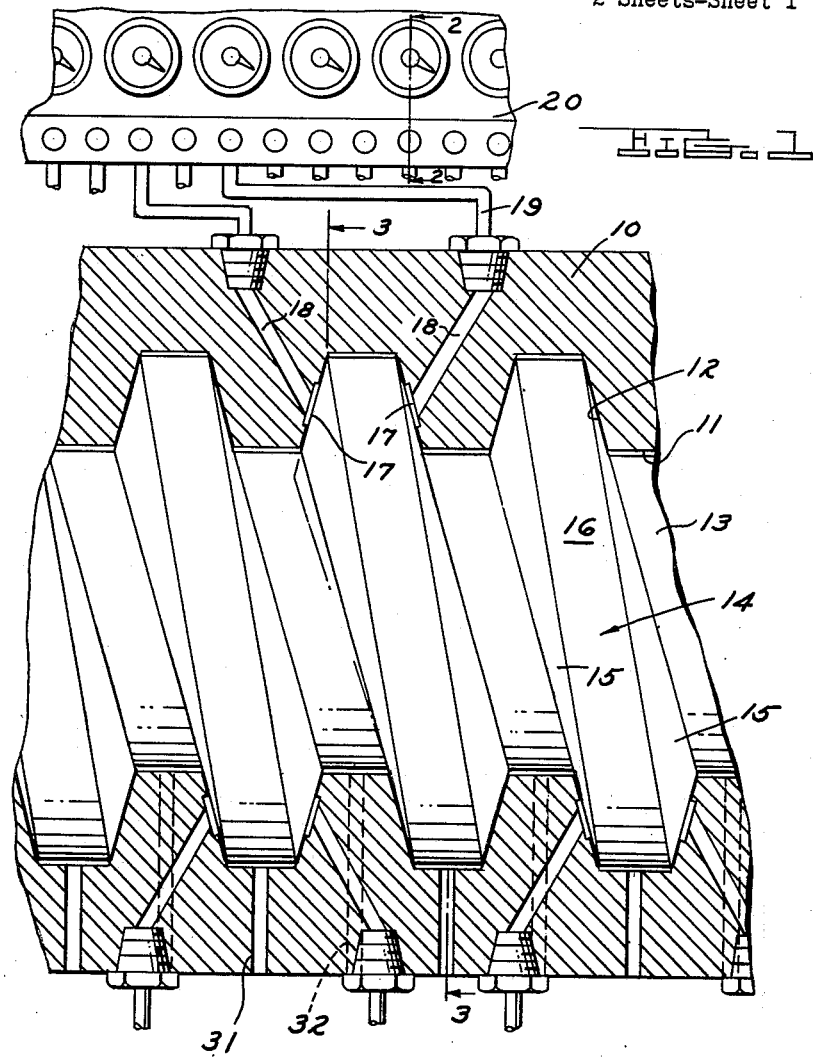
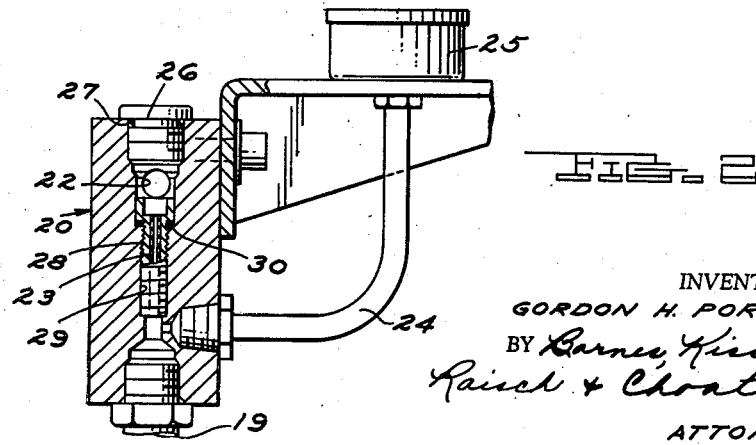
INVENTOR.
GORDON H. PORATH
BY
ATTORNEYS

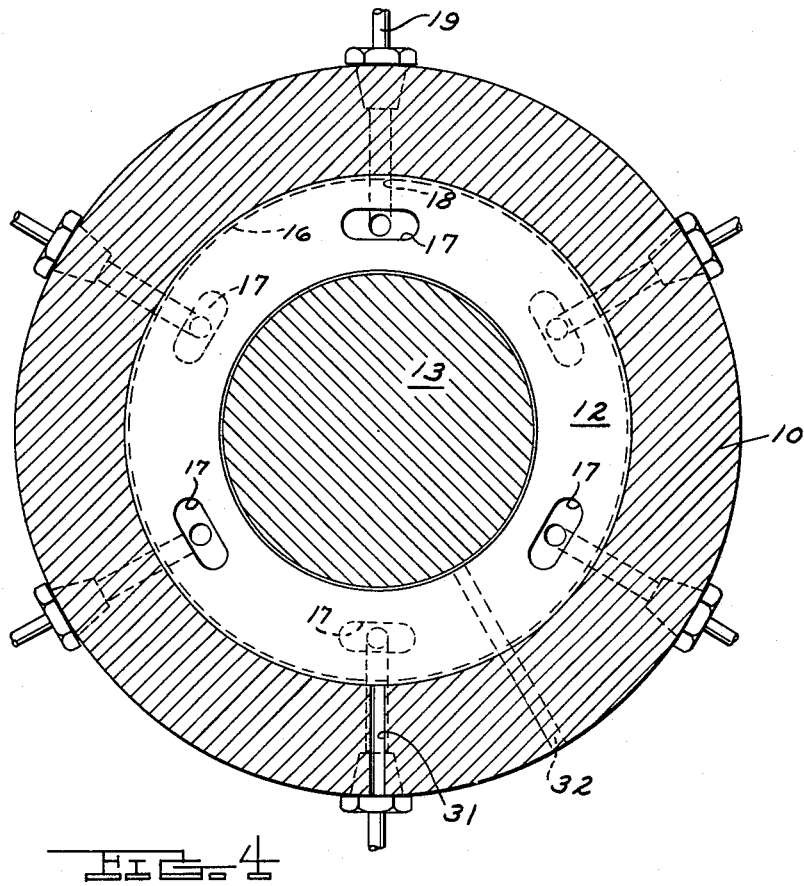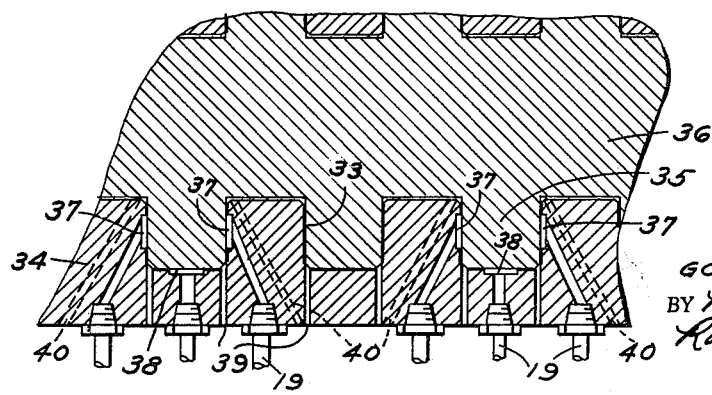

United States Patent Office 3,183,732
Patented May 18, 1965

3,183,732
PRECISION LEAD SCREW
Gordon H. Porath, 6101 Concord, Detroit, Mich.
Filed Dec. 11, 1962, Ser. No. 243,871
14 Claims. (Cl. 74—424.8)

This invention relates to screws such as lead screws which are used in machine tool and instrumentation applications.

This application is a continuation-in-part of application Serial No. 173,532, filed February 15, 1962, now abandoned.

In machine tools, gauges and instruments for checking precision parts such as are used in aircraft and space applications, it is often necessary to accurately move one member relative to another. In such applications, lead screws are often used. Such lead screws usually utilize a metal-to-metal contact resulting in substantial friction between the parts. This friction tends to prevent accurate movement of one member relative to another. Further, the sliding tolerance necessarily results in backlash. In addition, it is difficult to accurately machine the parts sufficiently to provide the accurate relationship and movement thereof. Further, the metal-to-metal contact results in wear which, in turn, results in loss of accuracy. As a result, it is not uncommon to find in screws such as heretofore used that substantial lateral and end play are present between the screw parts.

It is an object of this invention to provide a precision lead screw construction wherein the axes of rotation of the lead screw and the body into which the lead screw is threaded are maintained relative to one another in a stable relationship.

It is a further object of the invention to provide such a precision lead screw construction in which sliding metal-to-metal friction is completely eliminated and, therefore, the screw construction has substantially unlimited life.

It is a further object of the invention to provide such a precision lead screw construction which utilizes pressurized liquid from an external source as the load supporting medium between the body into which the screw is threaded and the screw.

It is a further object of the invention to provide such a precision lead screw construction which is capable of supporting varying loads so that it can be used for both rough and accurate movement in machine tools and instrumentation.

It is a further object of the invention to provide such a precision lead screw construction which is smooth and vibration free.

It is a further object of the invention to provide such a precision lead screw construction wherein the lead screw and nut can be made of a material having a low coefficient of heat expansion and thereby increase the accuracy thereof.

It is a further object of the invention to provide a precision lead screw construction that has no backlash.

It is a further object of the invention to provide a precision lead screw construction wherein inaccuracies in machining of the parts are entirely compensated for.

It is a further object of the invention to provide such a precision lead screw construction which requires substantially no power to rotate the screw relative to the body because sliding metal-to-metal friction is entirely eliminated.

Basically, the precision lead screw construction embodying the invention comprises a body or lead screw nut having a helical thread therein and a screw threaded into the helical thread, the relative dimensions between the threads being such that a space is provided between the parts. A plurality of pressurized recesses or pads are provided on the radial surfaces of one of the threads and an orifice is associated with each pad. Liquid under pressure is supplied to each pad through the orifice at a predetermined pressure. The liquid flows in a thin film between the radial surfaces and supports the body relative to the screw between the adjacent surfaces of the body and screw preferably in such a manner that the liquid dissipates its pressure by the time it reaches the edges of the radial surfaces. When the load either axially or radially increases, the body tends to move toward one pad or pads so that the flow of liquid from these pads is restricted; since liquid is being supplied continuously to each pad, the pressure in the pads increases. At the same time, the body tends to move away from the opposite pad or pads, unrestricting the flow and the pressure in these pad or pads increases. As a result, a pressure differential is created that tends to retain the body in its original position relative to the body. Because there is never any metal-to-metal contact, there is no wear on any of the parts. The arrangement not only provides for an accurate control of position of the body relative to the screw but, in addition, compensates for inaccuracies in the formation of the surfaces. In the case of screws having inclined radial faces, such as acme threads, pads need only be provided on the inclined radial surfaces of the thread. In the case of square threads, pads are provided on both the radial and axial surfaces of the threads.

In the drawings:

FIG. 1 is a partly diagrammatic part sectional view through a screw construction embodying the invention.

FIG. 2 is a fragmentary sectional view on an enlarged scale taken along the line 2—2 in FIG. 1.

FIG. 3 is a sectional view taken along the line 3—3 in FIG. 1.

FIG. 4 is a diagrammatic longitudinal sectional view through a modified form of screw construction.

Referring to FIG. 1, the precision lead screw embodying the invention comprises a nut or body 10 which may be the slide of a machine tool or the like which is to be moved and has an opening 11 therethrough along which a helical thread 12 is formed. A lead screw 13, which may be journalled on the machine and adapted to be rotated to move the body 10, has a complementary thread 14 thereon. The threads shown herein are of the acme type and comprise inclined radial surfaces 15 and axial crest surfaces 16.

According to the invention, a plurality of circumferentially spaced pressure recesses or pads are provided along the inclined radial surfaces of one of the threads, preferably the thread of the body. Thus, as shown in FIGS. 1 and 3, opposed pressure pads 17 are provided at circumferentially spaced points along the threads. The pads in one 360 degree length of the thread are preferably staggered with relation to the pads in another 360 degree length of the thread. Thus, as shown in FIG. 3, the pads 17 in solid lines along one 360 degree length of the thread, are staggered with relation to the pads 17 shown in dotted lines in another 360 degree length of the thread. Although the pads are preferably provided along all portions of the thread, they may be provided at only some portions of the thread depending on the load.

An orifice unit is provided for each pad and supplies liquid under predetermined pressure to each pad. As shown in FIGS. 1 and 3, passages 18 extend from the pads to the periphery of the body 10 and lines 19 provide communication to a manifold 20.

As shown in FIG. 2, liquid from a pressure source, not shown, passes to inlet 22 which supplies capillary tubes 23 providing a predetermined pressure drop. Thereafter, the liquid flows outwardly through outlets 19 to the respective pads. At the same time, a tube 24 has one end thereof positioned adjacent the outlet of the capillary tube 23 and provides communication with a pressure gauge 25 to continuously indicate the pressure of the liquid in its respective pressure pad. By this arrangement, it is possible to immediately note when a pressure pad is not operating properly as, for example, if the capillary tube becomes clogged. In order to provide access to the capillary tube 23, a cap 26 is threaded into the opening into which the capillary tube is provided. An O-ring 27 provides a proper seal. The capillary tube is fixed in a hole drilled in an Allen head screw 28, as by silver soldering. The screw 28 is, in turn, threaded into an opening 29 in the manifold 20, thus providing a readily accessible and replaceable orifice. An O-ring 30 provides a seal between the head of the screw 28 and the body of the manifold 20. The use of a capillary as the orifice provides an arrangement wherein a fixed control is achieved of the pressure with minimum danger of clogging.

The size and number of pressure pads is selected such that the body will be effectively supported relative to the screw and out of contact therewith. The relative dimensions between the surfaces of the body and screw is such that a thin film of liquid flows at a low velocity in a laminar fashion between the surfaces and substantially all the pressure of the liquid is dissipated when it finally leaves the space between the surfaces. The space between the pressure surfaces may range between two-thousandths (0.002) of an inch and one ten-thousandth (0.0001) of an inch and preferably between one-thousandth (0.001) of an inch and one ten-thousandth (0.0001) of an inch. Where machining limitations do not permit holding surfaces within such close tolerances, the surfaces are made as accurately as possible with at least some portions of the surfaces providing a space which is within the above limits.

The pressure surfaces are so arranged that the liquid flows substantially equal distances to the periphery. Drain openings 31, 32 extend from the base and crest of the threads.

In the form of the invention shown in FIG. 4, the threads 33 in body 34 and thread 35 on lead screws 36 are square threads. In such an arrangement, in order to provide for axial and lateral support, pads 37 are provided on the radial surfaces of the thread and pads 38 are provided on the axial surfaces of the thread. The edges of the threads 33, 35 are chamfered to provide annular drain passages to which the liquid flows to drains 39, 40. It can be appreciated that in this form of the invention, orifices in the form of capillary tubes are provided as in the previous form of the invention. The pads 37 are preferably circumferentially spaced with respect to the pads 38. Pads 37 are diametrically opposed to one another on each length of the thread. Pads can be provided in the crest surfaces of the thread of the body in addition to or instead of pads 28 on the root surfaces of the thread of the body as shown in FIG. 4.

It can thus be seen that there has been provided a precision screw construction wherein the body is maintained relative to the screw with the axes thereof in accurate, stable, predetermined frictionless position without backlash.

The manner in which the arrangement provides for stabilization of the body and screw can be readily understood by reference to FIG. 1. In the event that an axial or a radial force is provided which tends to move the body 10 downwardly or to the left, as shown in FIG. 1, the pressure in the left-hand pad 17 of each thread will be increased because of the restrictive action of the relative movement of the body and screw and the pressure in the opposed pad, or right-hand pad, will decrease producing a pressure differential that tends to return the body to its original centered position relative to the screw. It should be understood that the relative movements herein described are very slight such that they cannot be seen or measured. In the form of the invention shown in FIG. 4, axial forces are compensated for by the pads 38 on the radial surfaces and lateral or radial forces are compensated for by the pads 37 on the axial surfaces.

Although the invention has been described in connection with acme and square threads, it is also applicable to other threads such as American Standard, Whitworth, British Standard, sharp V, 29° worm, trapezoidal metric, buttress, saw tooth threads or other special threads having flat or curved surfaces.

It can thus be seen that in accordance with my invention there is provided a precision lead screw wherein the axis of rotation of the lead screw and the nut are maintained in stable, accurate, predetermined frictionless relation without backlash. The frictionless construction permits the use of a material such as Invar which has a low coefficient of heat expansion and thereby increases the accuracy of the precision lead screw. Such a material has not been heretofore practical because it is adaptable to metal-to-metal friction.

I claim:

1. In a precision lead screw and nut device, the combination comprising
   a body having an opening therethrough,
   a helical thread formed along the surface of said opening,
   a lead screw having a complementary helical thread threaded into said body,
   each of said threads having generally axial and radial surfaces,
   the radial surfaces of at least one of the threads having a plurality of circumferentially spaced isolated pressure pads provided therein,
   an orifice associated with each said pressure pad through which liquid under pretermined pressure is supplied to said pressure pad,
   each said orifice being adjustable for initial setting of pressure supplied to its respective orifice so that liquid under different pressures may be supplied to said orifices,
   the relative dimensions of said threads being such that a space is provided between the radial surfaces through which a pressurized film of liquid flows continuously so that forces on said body and screw are balanced by pressures in the pads thereby providing a permanent separation of the surfaces and retaining the body in accurate, stable, frictionless relation to the screw.

2. The combination set forth in claim 1 wherein said pads in any 360 degree portion of the thread are provided in opposed pairs.

3. The combination set forth in claim 1 wherein said pads in one 360 degree portion of the thread art staggered with relation to the pads in another 360 degree portion of the thread.

4. The combination set forth in claim 1 including drain openings in said body from adjacent the base and crest of the threads.

5. In a precision lead screw and nut device, the combination comprising
   a body having an opening therethrough,
   a helical thread formed along the surface of said opening,
   a lead screw having a complementary helical thread threaded into said body,
   each of said threads having axial crests and radial surfaces inclined with respect to the axial and radial axes,
   the radial surfaces of said thread in said body having a plurality of circumferentially spaced isolated pressure pads provided therein,
   an orifice associated with each said pressure pad through which liquid under pretermined pressure is supplied to said pressure pad,
   each said orifice being adjustable for initial setting of pressure supplied to its respective orifice so that liquid under different pressures may be supplied to said orifices,
   the relative dimensions of said threads being such that a space is provided between the radial surfaces through which a pressurized film of liquid flows continuously so that forces on said body and screw are balanced by pressures in the pads thereby providing a permanent separation of the surfaces and retaining the body in accurate, stable, frictionless relation to the screw.

6. The combination set forth in claim 5 wherein said pads in any 360 degree portion of the thread are provided in opposed pairs.

7. The combination set forth in claim 5 wherein said pads in one 360 degree portion of the thread are staggered with relation to the pads in another 360 degree portion of the thread.

8. The combination set forth in claim 5 including drain openings in said body from adjacent the base and crest of the threads.

9. In a precision lead screw and nut device, the combination comprising
a body having an opening therethrough and a helical thread formed along the surface of said opening,
a lead screw having a complementary helical thread threaded into said body,
each of said threads having axial surfaces and parallel radial surfaces at right angles to said axial surfaces,
the axial and radial surfaces of said thread in said body having a plurality of circumferentially spaced isolated pressure pads provided therein,
an orifice associated with each said pressure pad through which liquid under predetermined pressure is supplied to said pressure pad,
each said orifice being adjustable for initial setting of pressure supplied to its respective orifice so that liquid under different pressures may be supplied to said orifices,
the relative dimensions of said threads being such that a space is provided between the radial surfaces through which a pressurized film of liquid flows continuously so that forces on said body and screw are balanced by pressures in the pads thereby providing a permanent separation of the surfaces and retaining the body in accurate, stable, frictionless relation to the screw.

10. The combination set forth in claim 9 wherein said pads on said radial surfaces in any 360 degree portion of the thread are provided in opposed pairs.

11. The combination set forth in claim 9 wherein said pads in one 360 degree portion of the thread are staggered with relation to the pads in another 360 degree portion of the thread.

12. The combination set forth in claim 9 wherein the intersection of said axial and radial surfaces on one of said threads is chamfered to provide annular drain areas, said body having drain openings therein extending from said drain areas to the periphery of said body.

13. In a precision lead screw and nut device, the combination comprising
a body having an opening therethrough,
a helical thread formed along the surface of said opening,
a lead screw having a complementary helical thread threaded into said body,
each of said threads having generally axial and radial surfaces,
the radial surfaces of at least one of the threads having a plurality of circumferentially spaced isolated pressure pads provided therein,
an orifice associated with each said pressure pad through with liquid under predetermined pressure is supplied to said pressure pad,
each said orifice being adjustable for initial setting of pressure supplied to its respective orifice so that liquid under different pressures may be supplied to said orifices,
at least some portions of the space between the pressure surfaces ranging between two-thousandths (0.002) of an inch and one ten-thousandth (0.0001) of an inch,
the relative dimensions of said threads being such that a space is provided between the radial surfaces through which a pressurized film of liquid flows continuously so that forces on said body and screw are balanced by pressures in the pads thereby providing a permanent separation of the surfaces and retaining the body in accurate, stable, frictionless relation to the screw.

14. In a precision lead screw and nut device, the combination comprising
a body having an opening therethrough,
a helical thread formed along the surface of said opening,
a lead screw having a complementary helical thread threaded into said body,
each of said threads having axial crests and radial surfaces inclined with respect to the axial and radial axes,
the radial surfaces of said thread in said body having a plurality of circumferentially spaced isolated pressure pads provided therein,
an orifice associated with each said pressure pad through which liquid under predetermined pressures is supplied to said pressure pad,
a pressure gage associated with each said orifice,
each said orifice being adjustable for initial setting of pressure supplied to its respective orifice so that liquid under different pressures may be supplied to said orifices,
the relative dimensions of said threads being such that a space is provided between the radial surfaces through which a pressurized film of liquid flows continuously so that forces on said body and screw are balanced by pressures in the pads thereby providing a permanent separation of the surfaces and retaining the body in accurate, stable, frictionless relation to the screw.

References Cited by the Examiner
UNITED STATES PATENTS

| | | | |
|---|---|---|---|
| 585,192 | 6/97 | Emery | 308—9 X |
| 2,320,353 | 6/43 | Ernst et al. | 74—424.8 |
| 2,663,977 | 12/53 | Gerard et al. | 308—9 X |
| 2,760,832 | 8/56 | Bidwell | 308—9 |

DON A. WAITE, *Primary Examiner.*